(12) United States Patent
Tormasov et al.

(10) Patent No.: US 12,013,956 B2
(45) Date of Patent: Jun. 18, 2024

(54) SYSTEMS AND METHODS FOR VERIFYING USER ACTIVITY USING BEHAVIORAL MODELS

(71) Applicant: Acronis International GmbH, Schaffhausen (CH)

(72) Inventors: Alexander Tormasov, Moscow (RU); Noam Herold, Raanana (IL); Yury Averkiev, Singapore (SG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 437 days.

(21) Appl. No.: 17/487,115

(22) Filed: Sep. 28, 2021

(65) Prior Publication Data
US 2023/0139161 A1  May 4, 2023

Related U.S. Application Data

(63) Continuation-in-part of application No. 17/487,054, filed on Sep. 28, 2021, which is a continuation-in-part of application No. 17/486,069, filed on Sep. 27, 2021.

(51) Int. Cl.
*G06F 21/62* (2013.01)
*G06F 21/31* (2013.01)
(Continued)

(52) U.S. Cl.
CPC ............ *G06F 21/62* (2013.01); *G06F 21/316* (2013.01); *G06F 21/554* (2013.01); *G06N 20/00* (2019.01); *G06F 2221/032* (2013.01)

(58) Field of Classification Search
CPC ...... G06F 21/62; G06F 21/316; G06F 21/554; G06F 21/577; G06F 2221/032; G06F 2221/2151; G06N 20/00
See application file for complete search history.

(56) References Cited

U.S. PATENT DOCUMENTS 10,237,298 B1 * 3/2019 Nguyen ............... H04L 63/10
11,080,109 B1 * 8/2021 Poirel ............... G06F 16/24534
(Continued)

OTHER PUBLICATIONS

Albayram et al. "A Method for Improving Mobile Authentication Using Human Spatio-Temporal Behavior", 2013 IEEE Symposium on Computers and Communications, Jul. 7, 2013, pp. 305-311.

*Primary Examiner* — Han Yang
(74) *Attorney, Agent, or Firm* — ArentFox Schiff LLP; Michael Fainberg

(57) ABSTRACT

Disclosed herein are systems and methods for verifying user activity based on behavioral models. In an exemplary aspect, a method may include receiving and parsing sensor data from at least one sensor in an environment to determine a first identifier of a person that is not authorized to access data via a computing device. The method may include intercepting, on the computing device, a data access request including a second identifier of a user that is authorized to access the data via the computing device. The method may include verifying whether the data access request is from the user authorized to access data by determining whether a chain of events involving the first person and the user corresponds to a behavioral model indicative of malicious activity. Based on the verification, the data access request is either granted or denied.

17 Claims, 10 Drawing Sheets

(51) Int. Cl.
*G06F 21/55* (2013.01)
*G06N 20/00* (2019.01)

(56) References Cited

U.S. PATENT DOCUMENTS

2019/0130082 A1* 5/2019 Alameh .............. G06F 21/6218
2021/0234877 A1* 7/2021 Prabhu ................. H04L 63/102
2021/0243186 A1* 8/2021 Tormasov ............... G06F 21/32

* cited by examiner

SYSTEMS AND METHODS FOR VERIFYING USER ACTIVITY USING BEHAVIORAL MODELS

CROSS-REFERENCE TO RELATED APPLICATIONS

This application is a continuation-in-part of U.S. Non-Provisional application Ser. No. 17/487,054 filed Sep. 28, 2021, which further claims priority to U.S. Non-Provisional application Ser. No. 17/486,069 filed Sep. 27, 2021, both of which are herein incorporated by reference.

FIELD OF TECHNOLOGY

The present disclosure relates to the field of data security, and, more specifically, to systems and methods for verifying user activity based on behavioral models.

BACKGROUND

The conventional approach to identify a user of a system involves matching an input username and password. However, this approach does not address major security issues because it does not verify whether an authorized person, rather than a substitute, is providing the input. To fix this, different credentials such as physical objects (e.g., ID cards) or biometrics (e.g., fingerprints, iris scans, facial recognition, etc.) are sometimes used for authentication and validation. However, even these measures may be circumvented. For example, an unauthorized person may steal an ID card or may forge a fingerprint.

In general, intrusions, data leaks, data theft, etc., are not common occurrences. For example, a person using fake credentials (e.g., forged biometrics) to gain access to data on a given device is not a daily occurrence. However, the damage caused by such an attack can be massive. There is a limited number of effective ways to provide fake credentials. Thus, the method/process through which fake credentials are provided to circumvent security is identifiable. Conventional security systems fail to identify such methods/processes.

SUMMARY

To address these shortcomings, aspects of the disclosure describe methods and systems for verifying user activity based on behavioral models.

In some aspects, the techniques described herein relate to a method for verifying user activity based on behavioral models, the method including: receiving sensor data from at least one sensor in an environment; parsing the sensor data to determine a first identifier of a person that is not authorized to access data via a computing device; subsequent to determining the first identifier, intercepting a data access request on the computing device, wherein the data access request includes a second identifier of a user that is authorized to access the data via the computing device; verifying whether the data access request is from the user authorized to access data by: generating a chain of events for a period of time preceding the data access request, wherein the chain of events includes generated events including identifiers of the person that is not authorized to access the data via the computing device and the user that is authorized; determining whether the chain of events corresponds to a behavioral model indicative of malicious activity; and in response to determining that the chain of events do not correspond to the behavioral model, verifying that the data access request is from the user and granting the data access request.

In some aspects, the techniques described herein relate to a method, further including: in response to determining that the chain of events corresponds to the behavioral model, not verifying that the data access request is from the user and blocking the data access request.

In some aspects, the techniques described herein relate to a method, wherein generating the chain of events including the person and the user in response to determining the first identifier and intercepting the data access request with the second identifier within a threshold period of time.

In some aspects, the techniques described herein relate to a method, wherein determining whether the chain of events corresponds to a behavioral model indicative of malicious activity further includes: inputting the chain of events into a machine learning algorithm that classifies whether an input chain of events includes the malicious activity, wherein the machine learning algorithm is trained with a dataset that includes a plurality of behavioral models each including events associated with the malicious activity; and receiving an output from the machine learning algorithm indicating whether the chain of events corresponds to a behavioral model indicative of the malicious activity.

In some aspects, the techniques described herein relate to a method, further including: receiving a confirmation from the user that the data access request is not from the user; and in response to receiving the confirmation, re-training the machine learning algorithm to classify the chain of events as corresponding to a behavioral model indicative of the malicious activity.

In some aspects, the techniques described herein relate to a method, wherein the behavioral model is a target chain of events, and wherein determining whether the chain of events corresponds to the behavioral model includes: determining a deviation of the chain of events from the target chain of events that is indicative of the malicious activity; and in response to determining the deviation is less than a threshold deviation value, not verifying the data access request.

In some aspects, the techniques described herein relate to a method, wherein determining whether the chain of events corresponds to a behavioral model indicative of malicious activity is based on an order of events involving the person, another order of the events involving the user, and an amount of time in between each event.

In some aspects, the techniques described herein relate to a method, wherein each respective event in the target chain of events is assigned a weight indicative of an importance of the respective event.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
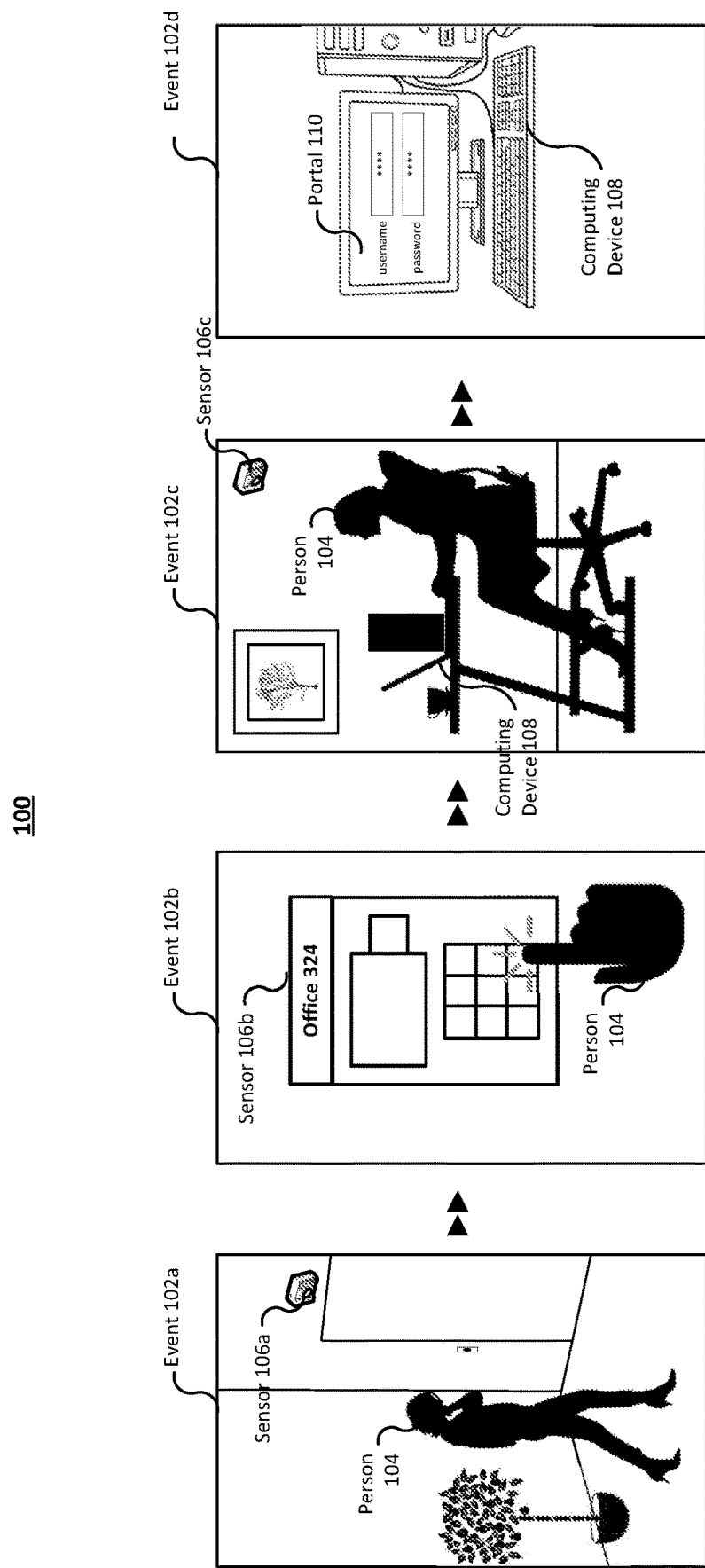
FIG. 1 is a diagram illustrating a chain of events detected by a security system for data access at a fixed device in a particular location.

Exemplary aspects are described herein in the context of a system, method, and computer program product for verifying user activity based on behavioral models. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

User identification is often verified in a vacuum. For example, a security system may only need a finite number of inputs from a user to verify whether the user is in fact the "authorized" user. If the user can provide the inputs (e.g., a password, a one-time access code, etc.), the user is granted access. However, as discussed previously, evaluating inputs in a vacuum makes unauthorized access easier. For example, even if a one-time access code is requested by a security system in addition to a password, an unauthorized person may have access to the device (e.g., a smartphone belonging to the authorized user) that receives the one-time access code and may deceive the security system.

Furthermore, additional inputs makes accessing data inconvenient for the actual user. For example, if a security system requests multiple access codes from different devices or a plurality of biometrics data (e.g., facial scan, fingerprint, etc.), the verification process becomes cumbersome. Ideally, a non-invasive and dynamic security system is needed to address these issues. The physical environment is a great tool for creating such a security system.

The present disclosure describes using various external data points and events in the physical world to build a certain image of reality that is consistent with other objects or events. Thus, the absence of any links in this system or chain of events can be assessed as an attempt at unauthorized access or an attack by an intruder. For example, if a user logs into a computer system at the workplace, the login process must be preceded by a series of physical actions and events such as the user entering the office building, calling an elevator, pressing the button for the desired floor, entering the room, etc. If at least one of the actions is not detected, for some reason, then the login may be an attempted intrusion into the system.

From a high-level perspective, an implementation may involve identifying different scenarios based on a particular situation (e.g., confirming the physical presence of a person), identifying a set of events associated with the situation (e.g., entering a building, moving from the bottom floor to the top, entering a room, etc.), identifying the sequence of these events (e.g., event A always precedes event B, event C can occur both before event B and after it, etc.), and determining the degree of criticality (e.g., a weight signifying importance) of the absence or change in the sequence of certain events.

Because the approach in the present disclosure is non-invasive (i.e., the user does not have to manually provide additional inputs), the success of the system may be dependent on the quality of data. For example, to verify whether a user entered a building, the security system may determine whether a face of the user was found in any security footage prior to the data access. In order to make this determination, the system may maintain a database of facial images of authorized users and compare a captured image of an individual against the database. If the security camera was unable to capture the individual's face completely, however, the facial match may result in a decision with low confidence. Suppose that a face match is "ideal" when two faces have at least an 80% match. There may be an uncertainty range in between 60% and 80% where a match is close, but not ideal. Suppose that the individual turned away from the camera or has a slight change in physical appearance (e.g., was wearing a hat, got a haircut, etc.). In order to bring certainty to such cases, the system may rely on supplemental environment data.

Supplemental environment data comprises environmental details that can potentially boost confidence scores of a security system. For example, an environmental detail may be the presence of a security guard. Due to a larger number of frames comprising the security guard, the system can confirm the identity of the security guard. If a security guard lets a person enter the building (even though the person's face is partially captured), the security system may determine that the person is an authorized user. Thus, if the system determines a facial match confidence score of 75% of a person that the security guard let into the building, the system may increase the confidence score from 75% to 80% (the minimum threshold).

FIG. 1 is a diagram illustrating chain of events 100 detected by a security system for data access at a fixed device in a particular location. Person 104 may enter an office building and the act of entering may be captured by sensor 106a (e.g., a security camera). In order to enter his/her actual office, person 104 may need to enter an access code or swipe his/her ID badge. Sensor 106b receives these credentials. As shown in FIG. 1, person 104 may enter an access code at sensor 106b to enter the office. Subsequently, person 104 may sit at his/her desk to access computing device 108 (e.g., a workstation comprising a computer or a laptop). Sensor 106c may be another camera that captures video of person 104. In some aspects, sensor 106c may be built-in to computing device 108. For example, sensor 106c may be a camera of computing device 108 that performs a facial scan. Person 104 may then enter login credentials into a portal 110 in order to access data.

Each of these actions may be identified as an event in a plurality of events 102. It should be noted that the sequence of the plurality of events 102 (also referred to as the chain of events) is important. For example, if event 102d happens before event 102a (i.e., a user accesses data computing device 108 before person 104 has entered the building), the access is likely unauthorized, even if the login credentials are valid. Likewise, if event 102c happens before event 102b, it is possible that the user accessing the data has somehow deceived a sensor.

Figure 2:
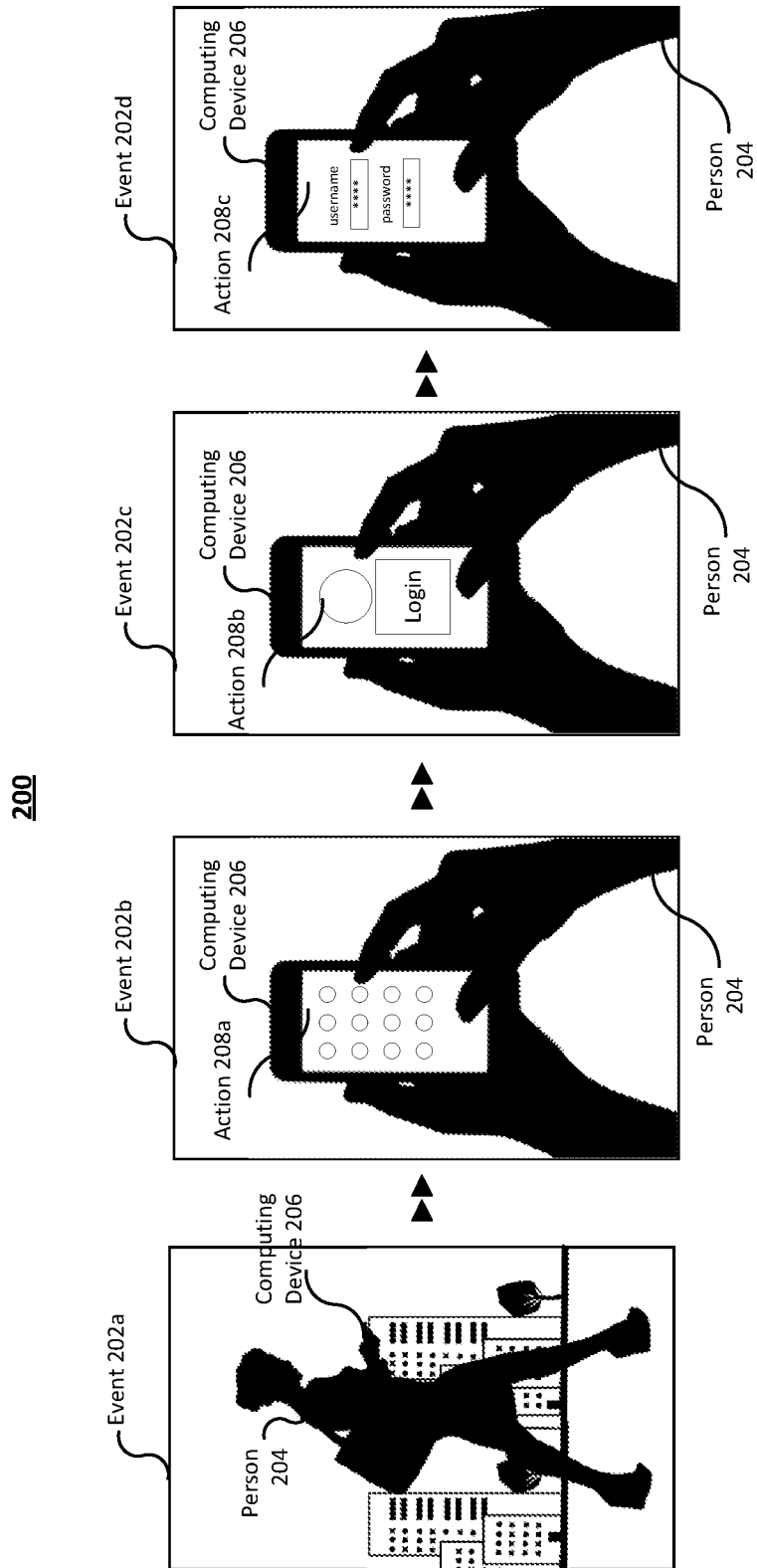
FIG. 2 is a diagram illustrating a chain of events detected by a security system for data access at a portable device.

FIG. 2 is a diagram illustrating chain of events 200 detected by a security system for data access at a portable device. In chain of events 200, event 202a may comprise person 204 turning on computing device 206 and entering a password or providing a biometric parameter (e.g., fingerprint, facial image) from a sleep state. Computing device 206 may be a smartphone. Event 202b comprises person 204 performing action 208a (e.g., a swipe) on an interface of computing device 206. Event 202c comprises person 204 performing action 208b (e.g., starting an application). Event 202d comprises person 204 performing action 208c (e.g., inputting login credentials in the application.

It should be noted that this sequence may be a routine way that person 204 accesses data on a particular application. Suppose that the chain of events is different. For example, event 202a (i.e., starting computing device 206) occurs multiple times because the user keeps providing the wrong password. Suppose that event 202b also occurs multiple times because the user cannot locate the application. These additional events suggest that unauthorized access is taking place and the login should be prevented regardless of whether the login credentials are correct.

Figure 3:
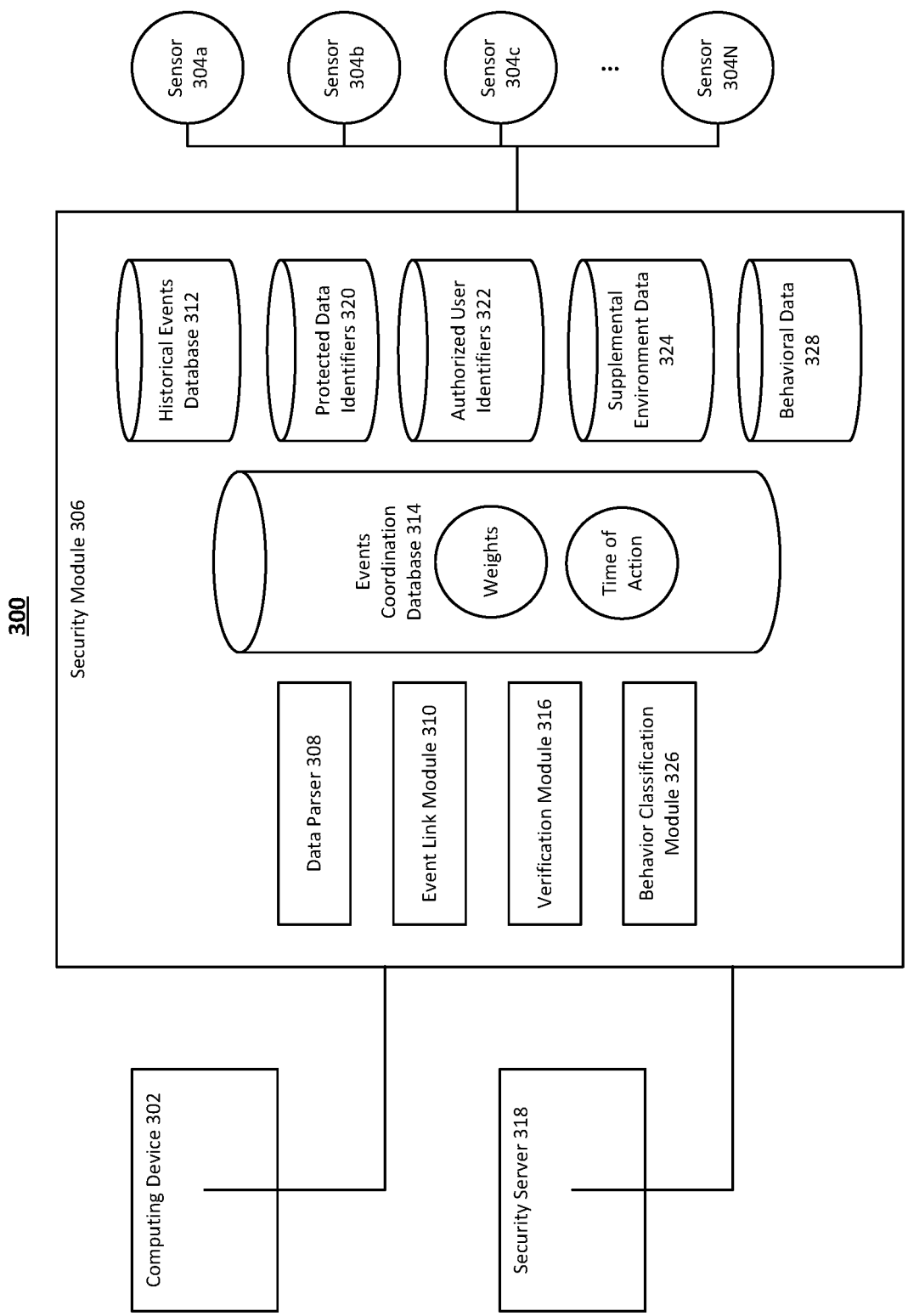
FIG. 3 is a block diagram illustrating a system for verifying user identity based on a chain of events.

FIG. 3 is a block diagram illustrating system 300 for verifying user identity based on a chain of events. System 300 comprises computing device 302 (which may be computing device 108 or computing device 206). In some aspects, computing device 302 executes security module 306 to verify user identity. In other aspects, security server 318 executes a thick client application of security module 306 (e.g., determines whether to allow or prevent access) and computing device 302 executes a thin client application of security module 306 (e.g., receives a verdict from the thick client and either enables or blocks access). In some aspects, security module 306 is a component of a firewall application.

Security module 306 may communicate with a plurality of sensors 304, which may be distributed in the physical environment around computing device 302. For example, sensor 304a may be sensor 106a, sensor 304b may be sensor 106b, sensor 304c may be sensor 106c, sensor 304N may be an embedded sensor in computing device 302 (e.g., a touchscreen).

Security module 306 comprises multiple components such as data parser 308, which takes information from the plurality of sensors 304 and converts them to a format compatible with event link module 310. Event link module 310 identifies an authorized person that is associated with computing device 302 and tracks their presence in the parsed data provided by data parser 308. In particular, event link module 310 generates a chain of events involving the authorized user. Verification module 316 is configured to determine whether the authorized user is the one who requested data access. In some aspects, verification module 316 utilizes data in historical events database 312 to determine whether a historical chain of events executed by an authorized user matches the current chain of events. In some aspects, verification module 316 utilizes data in events coordination database 314 to identify discrepancies in the current chain of events against an expected chain of events (which can be derived from historical events database 312). Using events coordination database 314, security module 306 may identify which events are missing in the current chain of events, the amount of time it takes each event to occur, and the importance of an event (e.g., weight of the event).

In an exemplary aspect, security module 306 detects a login attempt to access an application or data on computing device 302 that is listed in protected data identifiers 320. For example, security module 306 may intercept login credentials entered on computing device 302 for an email client and the name of the email client may be included in identifiers 320. In some aspects, security module 306 receives an indication (e.g., from a web application where the login credentials were provided) of whether the login credentials are correct. In response to receiving the indication, security module 306 determines whether the user that provided the login credentials is the authorized user of the application and/or computing device 302.

In some aspects, login credentials do not have to be provided to initiate security module 306. Security module 306 may intercept any attempt to access protected data. For example, a user may attempt to access a folder "My Documents," and security module 306 may intercept the action and prevent access until the identity of the user has been verified.

Security module 306 then retrieves, based on the intercepted information (e.g., login credentials) an identifier of the user. For example, security module 306 may retrieve the username from the login credentials. Security module 306 subsequently retrieves all other identifiers of the user available in authorized user identifiers 322. The other identifiers may be biometrics data (such as a facial image, a fingerprint scan, etc.), alternative usernames, access codes, badges, personal information (e.g., address, telephone number, etc.), or any other information that is unique to a particular user.

Security module 306 (particularly event link module 310) retrieves, from data parser 308, information captured within a period of time. This information may be associated with all of the retrieved identifiers and may be stored in historical events database 312. This information may include video footage of the individual (e.g., tagged clips using facial recognition—the clips captured by sensor 106a or sensor 106c), access code input records at a particular sensor (e.g., a PIN code provided at sensor 106b), fingerprint entry records, badge scan inputs, etc. The information may be divided in a plurality of events and each event may have at least one timestamp associated with it. For example, a video clip may be used to generate an event and may have a plurality of timestamps signifying when the video clip began and when it ended.

Data parser 308 may continuously receive information from the plurality of sensors 304 and may store parsed data in historical events database 312 as events. For example, sensor 304a may transmit video streams/clips to data parser 308. Data parser 308 may utilize computer vision techniques and/or machine learning algorithms (e.g., image classifier) to identify individuals in the video stream and assign an identifier to the individual. For example, if a person is present in a video clip, data parser 308 may identify the person based on a common image in authorized user identifiers 322 (e.g., a matching facial image), and generate an event indicating that the person is in the video within a particular time period (e.g., Monday 10:00 am ET to Monday 10:01 am ET). If the sensor that captured the video is associated with a particular location (e.g., the entrance to an office building), data parser 308 may further include location information in the event. Thus, the event produced by data parser 308 from data captured by sensor 304a may indicate that a person was located in the office entrance from Monday 10:00 am ET to Monday 10:01 am ET.

Event link module 310 thus has access to a plurality of events in historical events database 312 and does not have to initiate the parsing process after the login credentials or data access request is received. This accessibility minimizes delays for authorized users to access the data they wish to access. Event link module 310 retrieves all events within a period of time (e.g., one day) associated with an authorized user. If no events are available within the period of time, it is likely that the data request is malicious. For example, if a data request is made at computing device 108, and no events indicating the presence of person 104 (i.e., the authorized user) are found in historical events database 312, then verification module 316 may determine that the data access request should be blocked.

Confirming the identity of the person may be a difficult task however. Even if a facial recognition system has an accuracy of 99%, it will statistically make one error every one-hundred inputs. In the case of an office building that may have more than one hundred employees, this means that there will be potential error(s) every day. The same can be said for other types of inputs requiring voice recognition or biometrics recognition. Security module 306 may use supplemental environment data 324 to overcome this deficiency. The usage is further described in the description of FIG. 6.

Historical events database 312 may be organized based on identifiers of authorized users. This makes searching through historical events database 312 fast and efficient. Furthermore, each event may be in a compact format (e.g., a plurality of characters) to minimize the size of historical events database 312. In some aspects, events may be deleted if they are not accessed for more than a threshold period of time. For example, events that are more than a week old may be deleted. In some aspects, the only events generated by data parser 308 are associated with the authorized users of computing device 302 or applications stored on computing device 302. Thus, if a person is identified in a video captured by sensor 304a and the person is not an authorized user of computing device 302 or an application (e.g., an email client) on computing device 302, the event is not recorded.

Event link module 310 generates a chain of events by organizing each of the retrieved plurality of events associated with an authorized user based on timestamp. For example, event link module 310 may generate chain of events 100 comprising events 102a, 102b, 102c, and 102d.

Verification module 316 is configured to determine whether data access should be allowed based on the chain of events. Verification module 316 may refer to an events coordination database 314. The events coordination database 314 may include a plurality of target chain of events indicative of authorized access to the request data. An exemplary target chain of events may be stored as follows:

| Event | Sequence Number | Weight | Time of Action (minutes) |
|---|---|---|---|
| Enter building | 1 | 1.5 | — |
| Enter office | 2 | 1.2 | <5 |
| Access computing device | 3 | 1 | <2 |
| Provide login credentials | 4 | 1 | <10 |

The example indicates that in order to request a specific type of data, the following events need to be detected in relation to the authorized user: entering the building, entering the office, accessing the computing device, and providing the login credentials. The order is dictated by the sequence number. In some aspects, certain events may have multiple sequence numbers, which signify that the particular events can be in different order. The time of action represents the time difference between an event and the previous event. For example, the time difference between event 1 and event 2 is at most 5 minutes. This indicates that the time of action for event entering the office is at most 5 minutes after entering the building.

In some aspects, these target values may be set based on historical behavior data of the authorized user. For example, based on the authorized user's daily habits, it may be determined that the authorized user never spends more than 5 minutes to travel from the building entrance to the office entrance. In other aspects, these target values may be predetermined based on group studies. In the latter case, the target chain of events are applicable to any authorized user. In the former case, the target chain of events are tailored to a particular authorized user.

Verification module 316 then compares the determined chain of events 100 to the target chain of events. In particular, verification module 316 determines whether the sequence is correct, whether any events are missing, and/or the differences between the respective time of actions in each chain. Each chain may be formatted as a data structure. For example, chain of events 100 may be:

| Event | Sequence Number | Authorized User | Time | Sensor |
|---|---|---|---|---|
| Enter building | 1 | 104 | 10:00 am | 106a |
| Enter office | 2 | 104 | 10:02 am | 106b |
| Access computing device | 3 | 104 | 10:03 am | 106c |
| Provide login credentials | 4 | 104 | 10:09 am | 108 |

In some aspects, verification module 316 executes an algorithm that is a function of sequence number and/or time of action. The algorithm may result in a quantitative or qualitative output that verification module 316 compares against a threshold value. For example, verification module 316 may compare sequence values. For each event, if the sequence value is the same, the output is 0. If they are different, the output is 1. Subsequently, verification module 316 may evaluate the time of action. If the time differences in the determined chain of events is within the time of action in the target chain of events, the output is 0. If they are different, the output is a function of the difference in time. Verification module 316 may then combine the outputs and apply the weights. An example function is shown below:

$$\text{Deviation} = |\Sigma(\text{Seq No. Diff}_{eventi} + \text{Time Diff}_{eventi}) * \text{Weight}_{eventi}|$$

where the deviation for chain of events 100 is $|[(1-1)+(0)]*1.5+[(2-2)+(0)]*1.2+[(3-3)+(0)]*1+[(4-4)+(0)]*1| = 0$.

Suppose that an event is missing. For example, the user never enters the office. The deviation becomes:

$$|[(0-1)+(0)]*1.5+[(1-2)+(0)]*1.2+[(2-3)+(0)]*1+ [(3-4)+(0)]*1|=1.5+1.2+1+1=4.7.$$

If the threshold value to compare this value against is 3, then verification module 316 may determine that in the first instance, the user should be allowed access and in the second instance, the user should not be allowed access.

In some aspects, the threshold value to compare against is specific to a given target chain of events. In other aspects, the threshold value is universal and applies to all target chain of events.

It should be noted that verification module 316 may compare a determined chain of events against more than one target chain of events. Verification module 316 may specifically narrow down these target chain of events for comparison based on the type of data access request being made. The type of data access request may be based on the computing device being used. For example, some computing devices are fixed in a particular location and others are portable. The type of data access request may be based on application that is being accessed. For example, logging into a video streaming application may be associated with a different context than logging into a work related application.

For example, in the case of chain of events 200, verification module 316 may determine that the data request is being made on a portable device and that the events are more closely related to a particular application. Thus, the target chain of events selected for comparison by verification module 316 will be relevant to accessing the particular application on the portable device.

In some aspects, event link module 310 may filter out events from a determined chain that are not "key" events. For example, if a person enters a building and then goes to the cafeteria, the act of going to the cafeteria may not be included in the chain of events. Instead, event link module 310 may include events directly related to accessing the computing device (e.g., entering the location where the computing device is).

In some aspects, verification module 316 may identify discrepancies in the event sequences. For example, if determined chain of events 100 showed that the authorized person entered the building and then left the building, any data access after the point when the authorized person is no longer on premises is deemed malicious and is blocked by security module 306. Likewise, in FIG. 2, if in event 202a, person 204 enters the incorrect pin code at least a threshold number of times and has difficulty finding the application where the data request is made (e.g., person 204 keeps swiping without making an application selection), verification module 316 may identify the behavior as a discrepancy from normal usage. Other examples of discrepancies may include data access after the ownership of a portable device is reported lost (e.g., Find My iPhone feature initiated) and data access from an IP address not associated with the authorized user.

Figure 4:
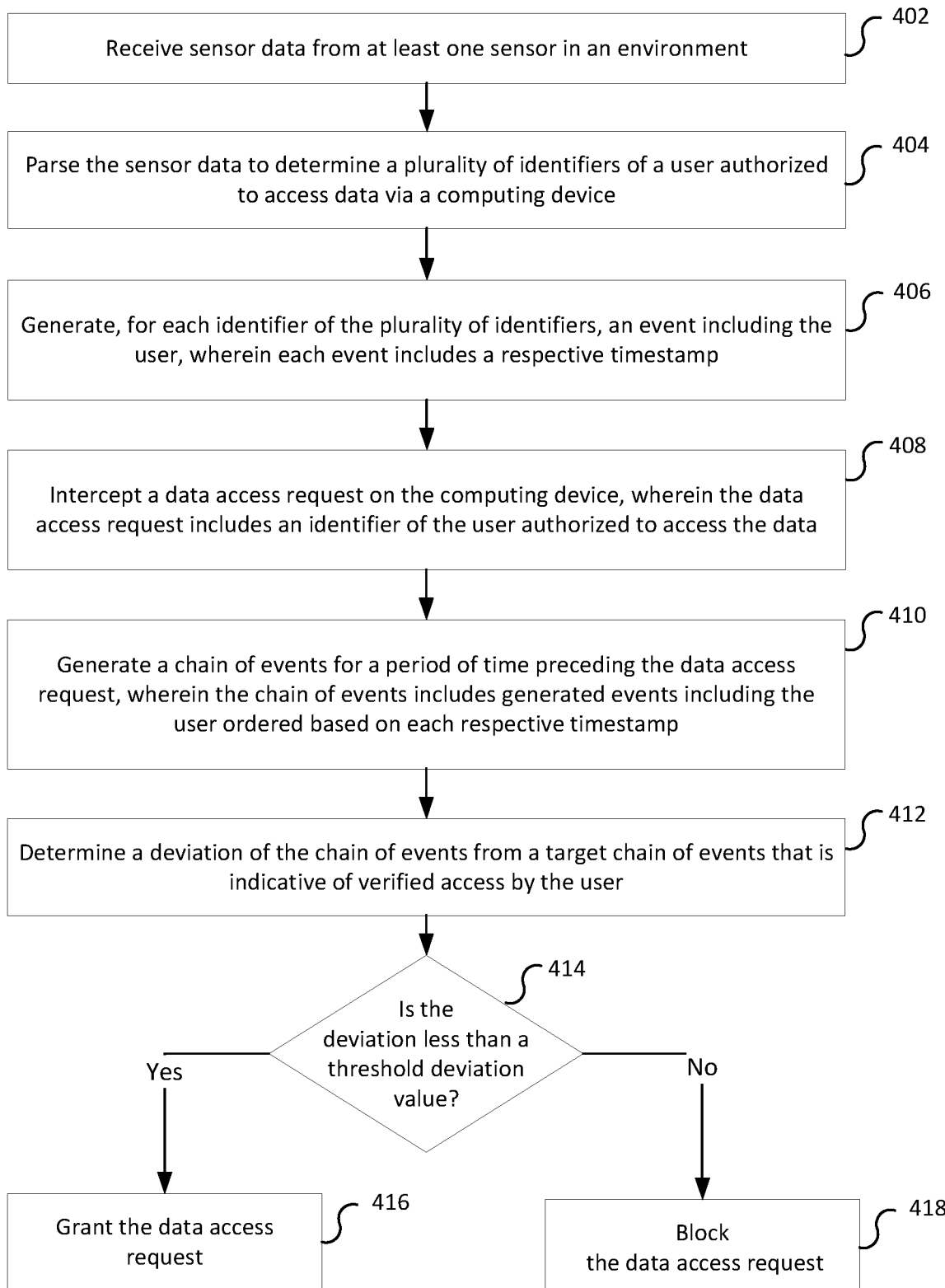
FIG. 4 illustrates a flow diagram of a method for verifying user identity based on a chain of events.

FIG. 4 illustrates a flow diagram of method 400 for verifying user identity based on a chain of events. At 402, data parser 308 of security module 306 receives sensor data from at least one sensor in an environment (e.g., sensors 304). At 404, data parser 308 parses the sensor data to determine a plurality of identifiers of a user authorized to access data via a computing device. For example, data parser 308 may identify a face of a user in a video and a badge scan of the user in an entry record. At 406, data parser 308 generates, for each identifier of the plurality of identifiers, an event including the user, wherein each event includes a respective timestamp. For example, data parser 308 may generate event 102a in response to detecting the face of person 104 and event 102b in response to detecting a badge scan at sensor 106b.

At 408, security module 306 intercepts a data access request on computing device 108, wherein the data access request includes an identifier of the user authorized to access the data. For example, security module 306 may detect that person 104 is attempting to login into computing device 108. The identifier may be a login credential of an authorized user of computing device 108. Accordingly, security module 306 verifies whether the data access request is from the user authorized to access data (e.g., is the person accessing computing device 108 actually person 104 or an imposter).

At 410, event link module 310 generates a chain of events (e.g., chain of events 100) for a period of time (e.g., 1 hour) preceding the data access request, wherein the chain of events includes generated events including the user ordered based on each respective timestamp. The chain of events may all include events generated by data parser 308 that involve an identifier of an authorized user (e.g., person 104).

At 412, verification module 316 determines a deviation (e.g., 2) of the chain of events from a target chain of events that is indicative of verified access by the user. The target chain of events may be retrieved from events coordination database 314. In some aspects, the data access request is of a first type of data access from a plurality of types and verification module 316 selects the target chain of events for comparison in response to determining that the target chain of events is also of the first type of data access.

In some aspects, the first type of data access is access from a computing device fixed at a particular location (e.g., computing device 108) and the target chain of events indicates a progression of the user entering the particular location and accessing the computing device. In other aspects, the first type of data access is access from a computing device that is portable (e.g., computing device 206), and the target chain of events indicates a progression of the user performing actions on the computing device to initiate the data access request (e.g., swipes and other navigation inputs received by a touchscreen sensor on computing device 206). In some aspects, the target chain of events is a historic chain of events performed by the user prior to a previous data access.

At 414, verification module 316 determines whether the deviation is less than a threshold deviation value (e.g., 3). In some aspects, the deviation is a function of an order of events and an amount of time allocated for each event and each respective event in the target chain of events is assigned a weight indicative of an importance of the respective event. In response to determining the deviation is less than a threshold deviation value, method 400 advances to 416, where verification module 316 verifies that the data access request is from the authorized user and grants the data access request (e.g., enables the login).

Alternatively, in response to determining the deviation is not less than the threshold deviation value, method 400 advances to 418, where verification module 316 does not verify that the data access request is from the authorized user and blocks the data access request. For example, security module 306 may generate an alert indicating that access is denied on a user interface of the computing device. In some aspects, security module 306 may further transmit the alert to another computing device of the authorized user associated with the identifier found in the data access request. This informs the authorized user that data access was attempted by an unrecognized person. The authorized user may then confirm the access request (to enable the access or deny it). Depending on the response, security module 306 may update the target chain of events in events coordination database 314. For example, if a blocked data access request is in fact authentic, security module 306 may include the detected chain of events in the events coordination database 314 so that a similar chain of events is not denied in the future.

Figure 5:
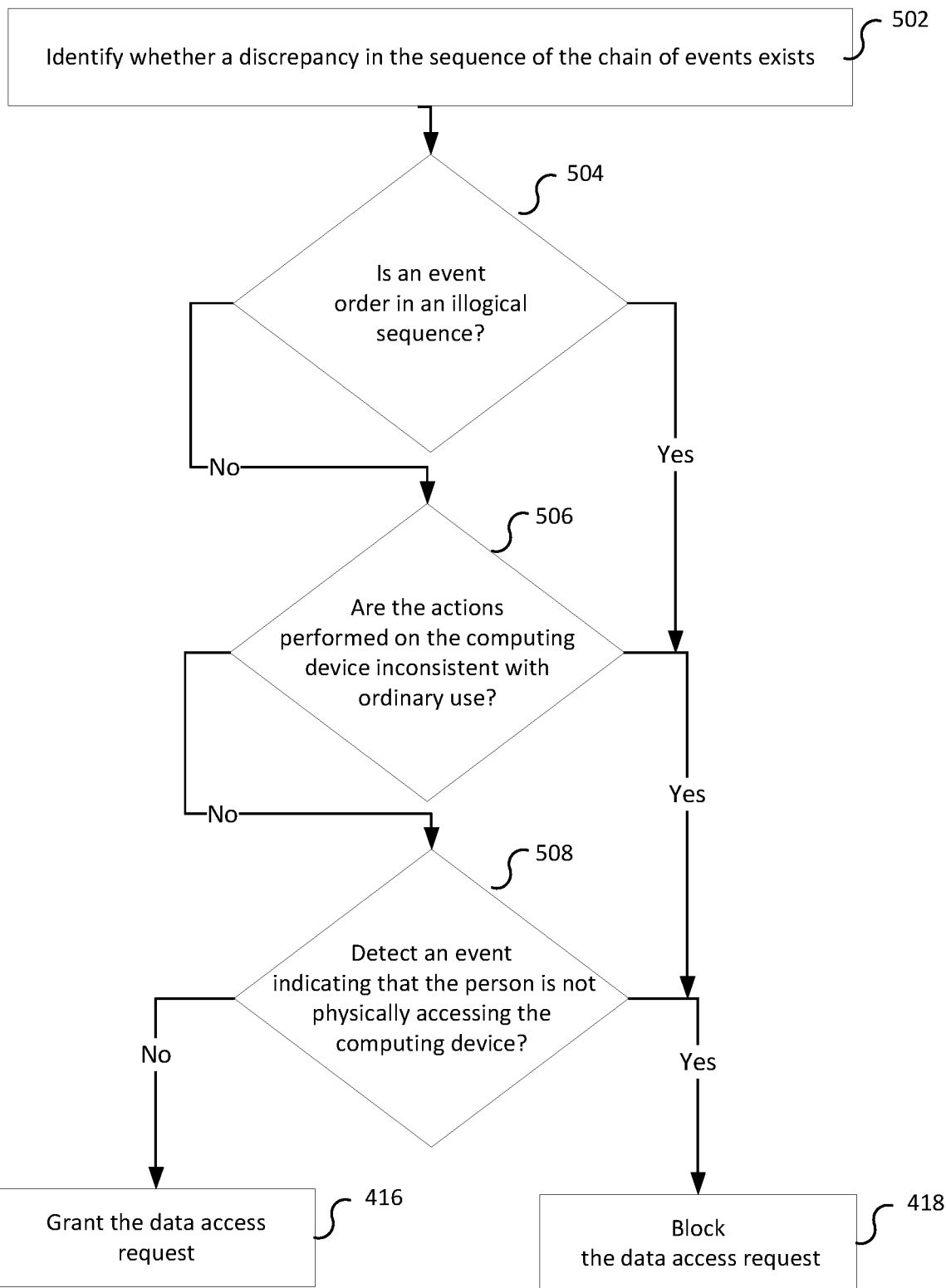
FIG. 5 illustrates a flow diagram of a method for identifying a discrepancy in the chain of events.

FIG. 5 illustrates a flow diagram of method 500 for identifying a discrepancy in the chain of events. At 502, verification module 316 identifies whether a discrepancy in the sequence of the chain of events exists. At 504, verification module 316 determines whether an event order is in an illogical sequence. For example, an illogical sequence would indicate that a person entered the building after entering his/her office inside the building. The order issue is determined using the sequence numbers in the target chain of events. If the event order has an illogical sequence, method 500 advances to 418.

If the event order does not have an illogical sequence, method 500 continues to 506, where verification module 316 determines whether the actions performed on the computing device are inconsistent with ordinary use. Examples of inconsistent actions may include entering incorrect login credentials more than a threshold number of times (e.g., 5 incorrect inputs), using a web application marked in a black list (e.g., a website where malicious activity can be downloaded), changing security settings, etc. If such actions are detected, verification module 316 may block the data access request at 418.

If such actions are not detected, method 500 advances to 508, where verification module 316 determines whether an event indicating that the authorized user is not physically accessing the computing device is detected. For example, an event may comprise the authorized person leaving the office. Any subsequent attempts for data access would need an event of the person returning to the office—otherwise the person is not physically present. Accordingly, the data access request should be denied at 418. Another example may be accessing a computing device that has been verified lost. If such an event is not detected, verification module 316 may determine that data access should be granted at 416 because a discrepancy does not exist.

Figure 6:
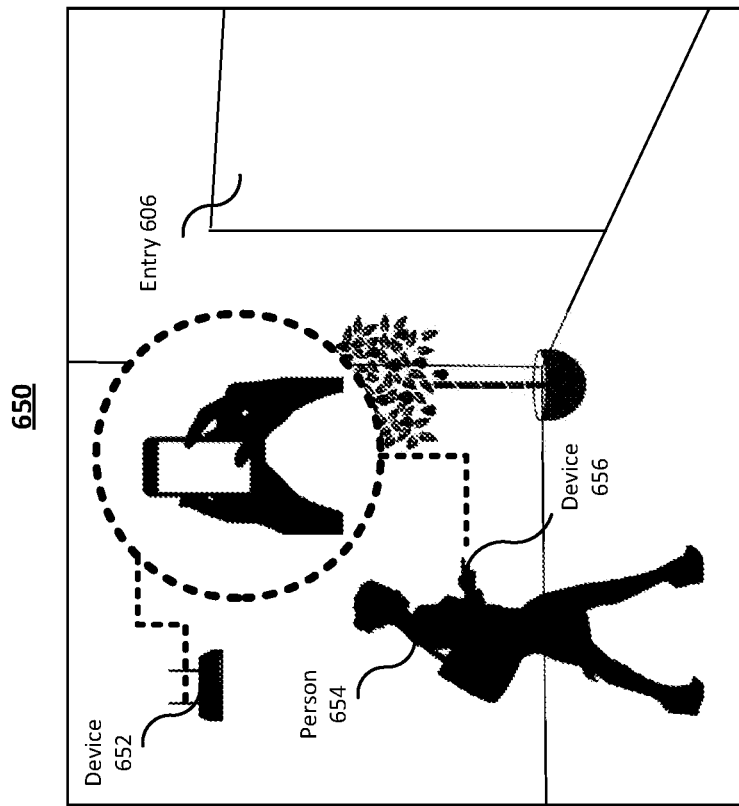
FIG. 6 illustrates events detected by a security system where supplemental environmental data is needed for authentication.
Figure 6:
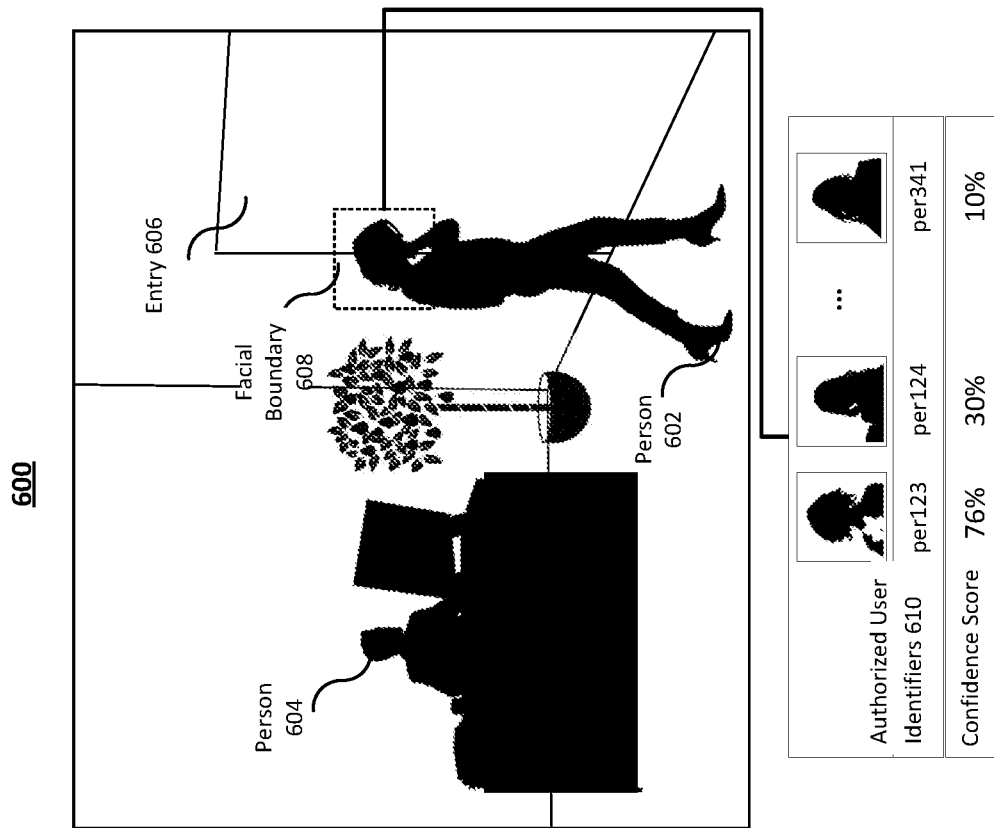

FIG. 6 depicts diagrams 600 and 650 illustrating events detected by a security system where supplemental environmental data is needed. In diagram 600, person 602 may enter an environment such as an office building. The entrance to the offices may be entry 606. A receptionist/security desk is placed in the vicinity of entry 606 and person 604 may be in charge of authorizing or denying people entry. Suppose that diagram 600 represents a view of a sensor 304 (e.g., a security camera). Upon successful identification of person 602, data parser 308 generates an event (e.g., event 102*a*) indicating that person 602 entered the office. Data parser 308 may comprise a plurality of recognition components such as facial recognition, voice recognition, and biometrics recognition among others. Each recognition component may output a classification of an identifier and a confidence score. For example, a facial recognition component in data parser 308 may output an identifier of the closest matching face in authorized user identifiers 610 and a confidence score representing the likelihood of the classification being correct.

Suppose that data parser 308 extracts a face of person 602 within facial boundary 608 (e.g., a shape centered around one or more facial attributes such as eyes, nose, mouth, etc.). Data parser 308 may compare the face to each known face in authorized user identifiers 610. For each face, a confidence score is generated. For example, there is a 76% confidence score that person 602 is "per123" and there is a 30% confidence score that person 602 is "per124." Data parser 308 may select the identifier with highest confidence score and compare the value of the confidence score to a threshold confidence score (e.g., 80%). If the confidence score is greater than the threshold confidence score, data parser 308 confirms that person 602 is "per123." In this case, however, the confidence score is 76%. Data parser 308 may thus determine whether the confidence score falls into an uncertainty range. The uncertainty range is bounded by two threshold confidence scores. The first threshold confidence score is a lower bound confidence score (e.g., 70%) and the second threshold confidence score is an upper bound confidence score (e.g., 80%). The uncertainty range represents confidence scores that are close to the threshold confidence score needed to confirm a match, but are slightly lower. A user or administrator can configured security module 306 to adjust the boundaries of the uncertainty range.

Suppose that person 602 is in fact "per123." In diagram 600, it is possible that person 602 is an authorized user that is simply looking away from the security camera or is holding an object (e.g., a phone) that is blocking the person's face. Due to this, data parser 308 can only generate a confidence score of 76% as a maximum. Because the confidence score is within the uncertainty range, data parser 308 may retrieve supplemental environment data 324. The type of supplemental environment data retrieved may be dependent on the event associated with identifier. For example, the event in diagram 600 is an entry into the environment captured by a security camera. The supplemental environment data may comprise tracking information of a security guard (e.g., person 604) along with timestamps. Data parser 308 may then determine whether, at the time of entry of person 602, whether person 604 was present. If person 604 was present (e.g., in the same frame), data parser 308 may increase the confidence score to the threshold confidence score. This is because person 604 may only allow authorized personnel to enter an environment. If the person is not authorized, person 604 will deny entry. If the person is allowed entry by person 604, it is likely that the authorized user that data parser 308 identifies as the closest match is in fact the person entering.

In diagram 650, there is no reception/desk. In this case, person 654 may be matched with an authorized user with a confidence score within the uncertainty range. Person 654 may be using a personal device 656 (e.g., a smartphone). The supplemental environment data in this case may be an indication of a connection between personal device 656 and environment device 652 (e.g., router). For example, when person 654 is detected by the security camera, environment device 652 may establish a wireless connection with personal device 656 within a threshold period of time. The identifier of personal device 656 may be stored in authorized user identifiers 322 in association with other identifiers of person 654. The presence of personal device 656 and a person who is identified as an authorized user with a confidence score in the uncertainty range—both within a threshold period of time from one another (e.g., 30 seconds) is an indication that the person is in fact the authorized user. Accordingly, data parser 308 may adjust the confidence score to be at or above the threshold confidence score (e.g., 80%).

FIG. 6 generally shows instances where the primary sensor data is coming from a camera (e.g., photos of authorized users). Accordingly, data parser 308 uses facial recognition. In other instances, the primary sensor data may be biometrics data (e.g., a retina scan, a fingerprint scan, etc.) or audio data (e.g., voice clip). In these instances, data parser 308 may compare acquired biometrics data with biometrics data of authorized users in authorized user identifier 322. The comparison of the data may also have confidence scores (e.g., fingerprints/iris match with 72% confidence score or vocal pattern matches with 77% confidence score).

In the case of an event where a voice clip is to be provided to access data or an area and the confidence score of matching the voice clip is in the uncertainty range, data parser 308 may identify other users in the room and other sound-producing objects as supplemental environment data. Background data may muffle a voice clip, preventing an adequate voice match. The supplemental environment data may include a list of known users in an environment (e.g., determined using security cameras or biometrics data) or objects in an environment (e.g., an air conditioner, a fan, an elevator, etc.) and filter out the sounds associated with the known users and objects from the voice clip. This produces a clearer voice clip, which can potentially increase the confidence score of data parser 308.

In some aspects, if neither a security guard is present nor a personal device that can connect to an environment device, the supplemental environment data may comprise an occupancy count of the environment when the respective identifier was detected. A person that is impersonating an authorized user may use copied biometrics data or voice clips. Suppose that the impersonator is alone (e.g., to avoid getting caught by people), the supplemental environment data may identify a discrepancy in the number of people in the environment. The occupancy count may be tracked by sensors positioned near the entry of the environment. If the occupancy count is 1 (i.e., the impersonator) and there is additional identifiers detected by sensors 304 in the environment, data parser 308 may determine that the authorized person is not in the environment. For example, if the impersonator talks and two voices are picked up by the microphone, data parser 308 may detect the discrepancy and confirm that the individual is not an authorized user.

Figure 7:
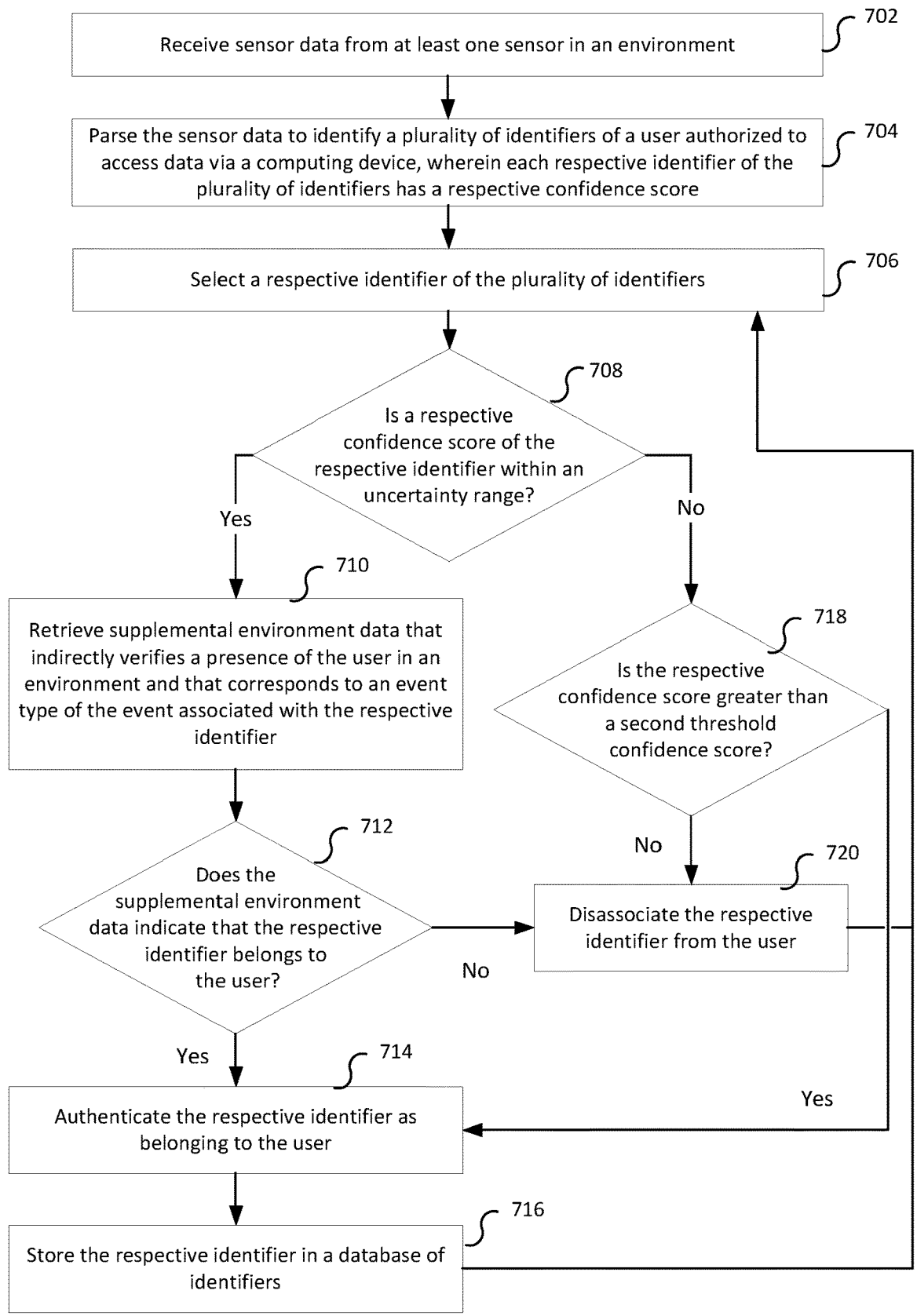
FIG. 7 illustrates a flow diagram of a method for authenticating user identity based on supplemental environment data.

FIG. 7 illustrates a flow diagram of method 700 for authenticating user identity based on supplemental environment data. At 702, data parser 308 receives sensor data from at least one sensor in an environment (e.g., sensors 304). At 704, data parser 308 parses the sensor data to identify a plurality of identifiers of a user authorized to access data via a computing device, wherein each respective identifier of the plurality of identifiers has a respective confidence score indicative of whether the respective identifier belongs to the user (e.g., 76% confidence that identifier "per123" is associated with person 602), and wherein each respective identifier is associated with an event involving the user (e.g., entering a building).

At 706, data parser 308 selects a respective identifier (e.g., "per123"). At 708, data parser 308 determines whether a respective confidence score of the respective identifier is within an uncertainty range bounded by a first threshold confidence score and a second threshold confidence score (e.g., 70% to 80%). In response to determining that the respective confidence score is not in the uncertainty range, method 700 proceeds to 718, where data parser 308 determines whether the respective confidence score is greater than the second threshold confidence score. If the confidence score is greater than the second threshold confidence score, method 700 advances to 714, where data parser 308 authenticates the respective identifier as belonging to the user.

Otherwise, method 700 advances to 720, where data parser 308 disassociates the respective identifier from the user (e.g., generates a tag that person 602 is not "per123"). From 714, method 700 advances to 716, where data parser 308 stores the respective identifier in a database of identifiers (e.g., historical events database 312).

If at 708, data parser 308 determines that the respective confidence score is within the uncertainty range, method 700 advances to 710, where data parser 308 retrieves supplemental environment data that indirectly verifies a presence of the user in an environment and that corresponds to an event type of the event associated with the respective identifier. For example, an entry event may be associated with the presence of a security guard.

At 712, data parser 308 determines whether the supplemental environment data indicates that the respective identifier belongs to the user. For example, if the supplemental environment data indicates the presence of a security guard at the time of entry of person 602, the supplemental environment data indirectly confirms that the respective identifier belongs to the user (i.e., because the security guard granted entry).

If the supplemental environment data does not indicate that the identifier belongs to the user, method 700 advances to 720. If the supplemental environment data does indicate that the identifier belongs to the user, method 700 advances to 714 and then 716. From 716 and 720, method 700 returns to 706, where data parser 308 selects another respective identifier for authentication purposes.

Figure 8:
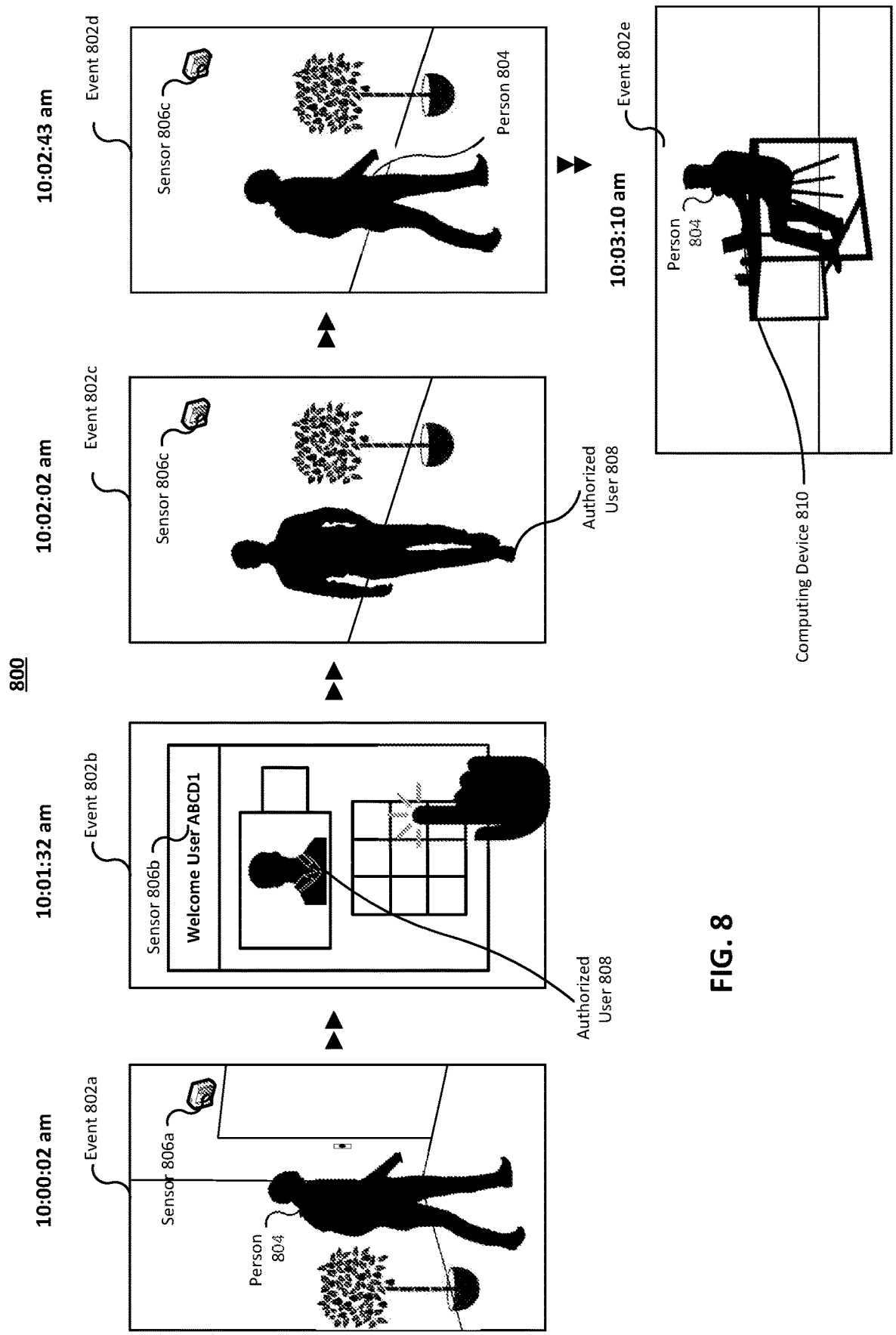
FIG. 8 illustrates events detected by a security system in which a person not authorized to access data is detected prior to a data access request.

FIG. 8 illustrates an example chain of events 800 in which a person not authorized to access data is detected prior to a data access request. Up until now there has been discussion about identifying authorized users, determining the events they have been a part of, and determining whether data access is part of those events. This is under the assumption that the data access is likely originating from the authorized user. If there is an inconsistency in the events involving the user, then it is concluded that the data access may not have been from the authorized user after all. Another approach to verifying whether the data access is authentic is by referring to behavioral models that consider situations as a whole. In this approach, it is not inherently believed that the data access is authentic. Instead, the approach is triggered with the detection of someone who is not authorized to access data.

For example, data parser 308 may receive sensor data from at least one sensor in an environment (e.g., sensor 806a) and may parse the sensor data to determine a first identifier of a person that is not authorized to access data via a computing device. Suppose that person 804 is an intruder that is not recognized by security module 306. More specifically, the first identifier may be a facial image of person 804 and security module 306 may conclude that the facial image does not match any facial image in authorized user identifiers 322. Based on this conclusion, data parser 308 may determine that person 804 is not authorized to access data on computing device 810.

Subsequent to determining the first identifier, security module 306 may intercept a data access request on computing device 810. The data access request may include a second identifier of a user that is authorized to access the data via the computing device. For example, the second identifier may be a username/password combination that belongs to authorized user 808. Security module 306 may then verify whether the data access request is from the user authorized to access data (i.e., authorized user 808). For example, data parser 308 may generate chain of events 802 for a period of time preceding the data access request. Chain of events 802 specifically includes generated events including identifiers of person 804 that is not authorized to access the data via computing device 810 and authorized user 808 that is authorized.

Behavior classification module 326 determines whether chain of events 802 corresponds to a behavioral model indicative of malicious activity in behavioral data 328. In response to determining that chain of events 802 do not correspond to the behavioral model in behavioral data 328, verification module 316 verifies that the data access request is from authorized user 808 and grants the data access request. In response to determining that chain of events 802 corresponds to the behavioral model, verification module 316 does not verify that the data access request is from the user and blocks the data access request.

In chain of events 800, event 802a is associated with a timestamp of 10:00:02 am. Event 802a may note the entry of person 804 into the environment, as detected by sensor 806a. The second event in chain of events 800 is event 802b, which has an associated timestamp of 10:01:32 am. Event 802b may note that a correct passcode to enter the office of authorized user 808 (i.e., "userABCD1" may be an identifier of authorized user 808) has been received at sensor 806b. The third event in chain of events 800 is event 802c, which has an associated timestamp of 10:02:02 am. In event 802c, authorized user 808 may be detected by sensor 806c (e.g., a camera) in a hallway outside of authorized user 808's office. The fourth event in chain of events 800 is event 802d, which has an associated timestamp of 10:02:43 am. The fourth event involves detecting person 804 in the hallway. The fifth event in chain of events 800 is event 802e, which has an associated timestamp of 10:03:10 am. In the fifth event, a data access request is received at computing device 810. The system needs to verify whether the data access request is from person 804 or authorized user 808.

Suppose that at 10:00:02 am, person 804 enters the building as an intruder. At 10:01:32 am, authorized user 808 may enter his/her office by entering their passcode into a smart lock (i.e., sensor 806b). At 10:02:02 am, authorized user 808 may briefly step out of the office. At 10:02:43 am, person 804 may see that authorized user 808 has left the office may access the office. At 10:03:10 am, person 804 initiates a data access request at computing device 810 without permission. In this scenario, person 804 should be blocked from accessing any data on computing device 810. If person 804 was not detected in event 802a, security module 806 may conclude that the data access request is authorized (i.e., under the assumption that authorized user 808 may have stepped out briefly and returned to his/her office at 10:02 am). However, because an unauthorized person is detected, there is a possibility that the access may be unauthorized and should be blocked.

Chain of events 800 may be described in an input data structure for behavior classification module such as:

| Time | Authorized Personnel? | Event | Weight |
|---|---|---|---|
| 10:00:02 | No | ENTR | 1.0 |
| 10:01:32 | Yes | CCDE | 1.0 |
| 10:02:02 | Yes | EX | 1.2 |
| 10:02:43 | No | EN | 1.2 |
| 10:03:10 | — | ACC | 1.0 |

Each event may be characterized by an event code. For example, "entr" may represent an entry into an environment, "ccde" may represent input of a correct passcode, "ex" represents an exit, "en" represents an entry, "acc" may represent the data access request. It should be noted that there may be a plurality of event codes that can describe a plethora of events. Event codes may also be customized according to the layout of the environment. For example, "entr1" may be entry into a first area of the environment, "entr2" may be entry into a second area of the environment, etc. For each event, the data structure may indicate whether authorized personnel is detected in the event. For example, for event 1, person 804 (who is not authorized) is detected and therefore the field is "no."

Behavior classification module 326 may be a classification machine learning model (e.g., utilizing Bayes classifier) that determines whether the authorized personnel field for the last event involves authorized personnel or not. In some aspects, behavior classification module 326 is a neural network with a plurality of layers. Behavior classification module 326 may be trained on a plurality of behavior models (target chain of events) which are stored in behavioral data 328. Some target chain of events may indicate malicious activity (e.g., access by unauthorized personnel) and some indicate normal activity. Each behavioral model may be a target chain of events represented by a data structure that is similar to the data structure representing chain of events 800. For example, a training behavior model may be:

| Time | Authorized Personnel? | Event | Weight |
|---|---|---|---|
| 1:58:01 | No | ENTR | 1.2 |
| 1:59:45 | Yes | CCDE | 1.0 |
| 2:02:53 | Yes | EX | 1.0 |
| 2:04:53 | No | EN | 1.2 |
| 2:05:10 | No | ACC | 1.0 |

In this example, the data access request is made by unauthorized personnel. Given the commonality between events and timestamps, it may be determined by behavior classification module 326 that the input data structure of chain of events 800 involves malicious activity. In particular, the training of behavior classification module 326 enables the module to discern relationships between events and when they occur and the time between each event. More specifically, behavior classification module 326 is able to determine whether the chain of events corresponds to a behavioral model indicative of malicious activity based on an order of events involving person 804, another order of the events involving authorized user 808, and an amount of time in between each event. If person 804 enters the environment and leaves the environment before the data access request, for example, the likelihood of the data access request being from authorized user 808 increases. If authorized user 808 leaves his/her office and person 804 appears at the scene a few seconds/minutes later, the likelihood of the data access request being from authorized user 808 decreases. The plurality of target chain of events used to train behavior classification module 326 captures a variety of simulated and actual scenarios (e.g., terrorist attacks, robberies, intrusions, etc.) to enable the machine learning algorithm to understand the relationships between event order, time, and authority.

In some aspects, each respective event in the target chain of events is assigned a weight indicative of an importance of the respective event. For example, the unauthorized user exiting/entering an area is given more weight because they are a likely cause for any unauthorized access of data. These weights may influence the machine learning algorithm weights that the machine learning model uses to classify the person accessing the data (i.e., the weights multiplied with an input vector to generate the binary output).

Re-training behavior classification module 326 may also improve the accuracy of its output. For example, security module 306 may receive a confirmation from the user that the data access request is not from the user. This feedback is useful because the input chain of events can be stored in behavioral data 328 as a target chain of events indicative of malicious activity. In response to receiving the confirmation, security module 306 may re-train behavior classification module 326 to classify the input chain of events (e.g., chain of events 800) as corresponding to a behavioral model indicative of the malicious activity.

In some aspects, security module 306 determines whether the data access request was intercepted within a threshold period of time from determining the first identifier. For example, the threshold period of time may be 30 minutes. If person 804 was last detected more than 30 minutes before the data access request at 10:03:10 am, security module 306 may not include events involving person 804 into the chain of events. In this case, security module 306 may instead execute method 400.

In some aspects, behavior classification module 326 may directly compare each target chain of events data structure with an input chain of events data structure and determine a deviation of the chain of events from the target chain of events (as described above). In response to determining the deviation is less than a threshold deviation value, verification module 316 may not verify the data access request.

Figure 9:
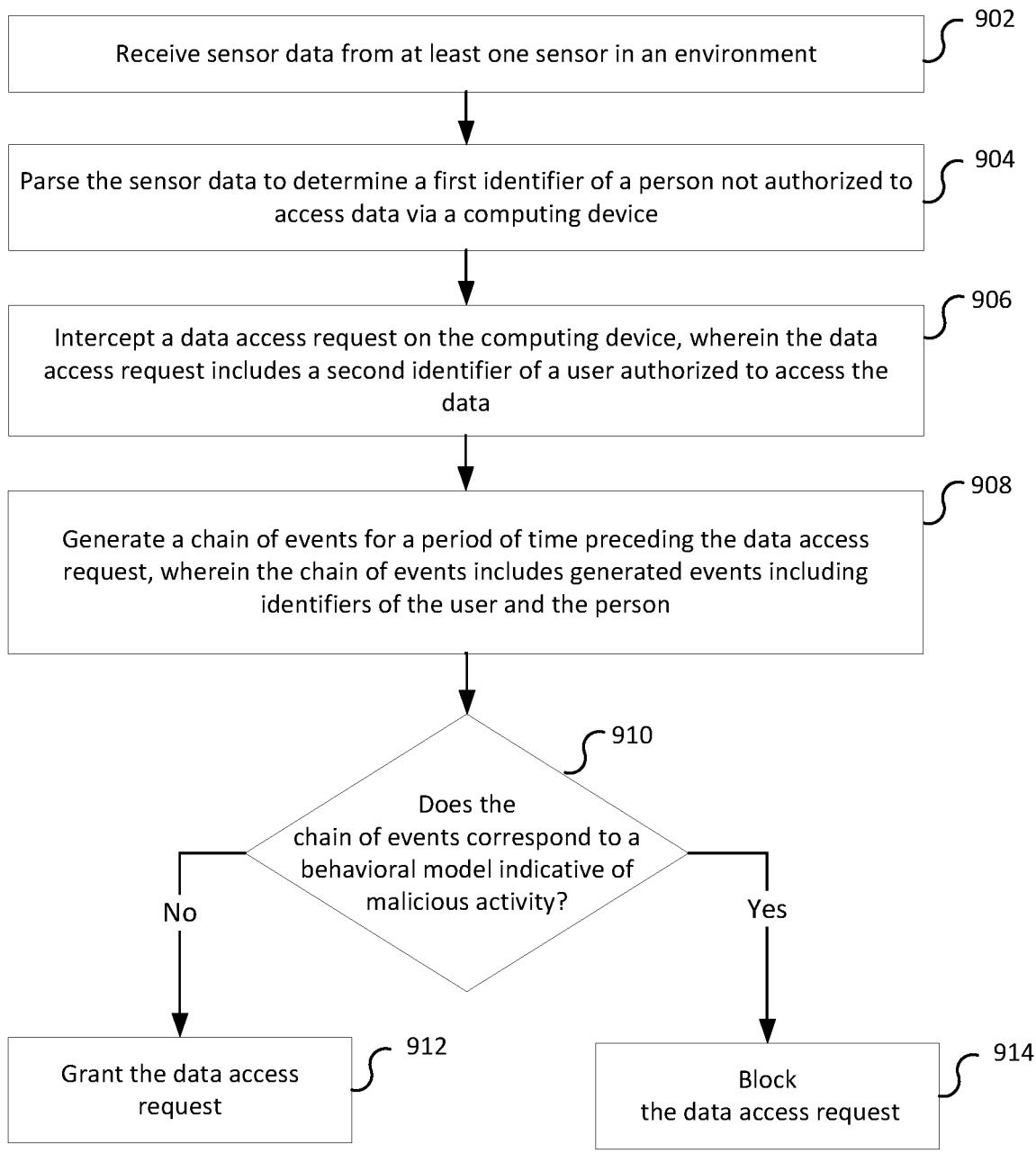
FIG. 9 illustrates a flow diagram of a method for authenticating user activity based on behavioral models.

FIG. 9 illustrates a flow diagram of method 900 for authenticating user activity based on behavioral models. At 902, security module 306 receives sensor data from at least one sensor in an environment. At 904, security module 306 parses the sensor data to determine a first identifier of a person not authorized to access data via a computing device. At 906, security module 306 intercepts a data access request on the computing device, wherein the data access request includes a second identifier of a user authorized to access the data. At 908, security module 306 generates a chain of events for a period of time preceding the data access request, wherein the chain of events includes generated events including identifiers of the user and the person. At 910, security module 306 determines whether the chain of events corresponds to a behavioral model indicative of malicious activity. In response to determining that the chain of events corresponds to a behavioral model, method 900 advances to 914, where security module 306 blocks the data access request. Otherwise, method 900 advances to 912, where security module 306 grants the data access request.

Figure 10:
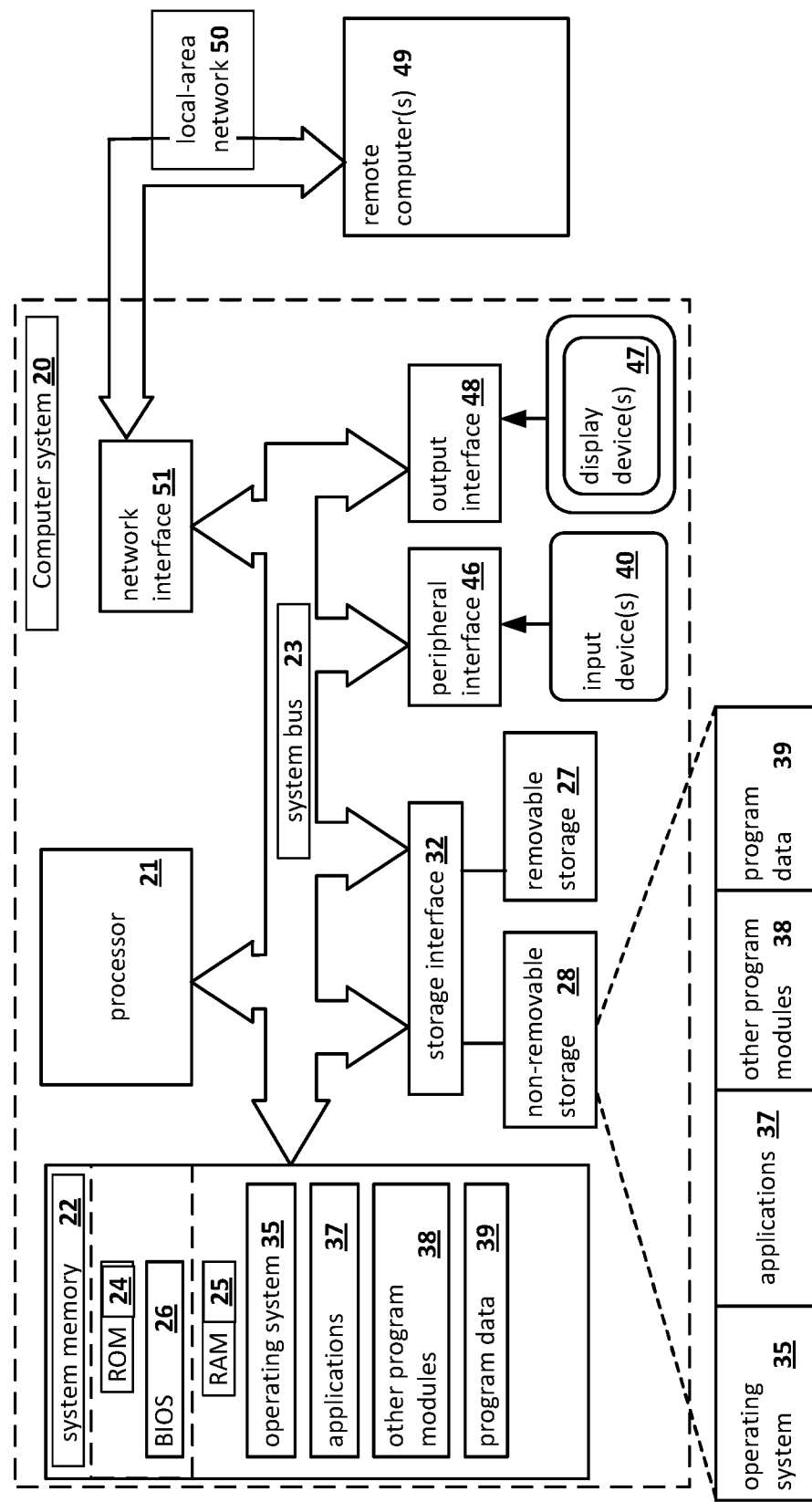
FIG. 10 presents an example of a general-purpose computer system on which aspects of the present disclosure can be implemented.

FIG. 10 is a block diagram illustrating a computer system 20 on which aspects of systems and methods for verifying user activity based on behavioral models may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-9 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for verifying user activity based on behavioral models, the method comprising:
receiving sensor data from at least one sensor in an environment;
parsing the sensor data to determine a first identifier of a person that is not authorized to access data via a computing device;

subsequent to determining the first identifier, intercepting a data access request on the computing device, wherein the data access request includes a second identifier of a user that is authorized to access the data via the computing device;

verifying whether the data access request is from the user authorized to access data by:

generating a chain of events for a period of time preceding the data access request, wherein the chain of events includes generated events including identifiers of the person that is not authorized to access the data via the computing device and the user that is authorized;

determining whether the chain of events corresponds to a behavioral model indicative of malicious activity; and in response to determining that the chain of events do not correspond to the behavioral model, verifying that the data access request is from the user and granting the data access request.

2. The method of claim 1, further comprising:

in response to determining that the chain of events corresponds to the behavioral model, not verifying that the data access request is from the user and blocking the data access request.

3. The method of claim 1, wherein generating the chain of events including the person and the user in response to determining the first identifier and intercepting the data access request with the second identifier within a threshold period of time.

4. The method of claim 1, wherein determining whether the chain of events corresponds to a behavioral model indicative of malicious activity further comprises:

inputting the chain of events into a machine learning algorithm that classifies whether an input chain of events comprises the malicious activity, wherein the machine learning algorithm is trained with a dataset that comprises a plurality of behavioral models each including events associated with the malicious activity; and receiving an output from the machine learning algorithm indicating whether the chain of events corresponds to a behavioral model indicative of the malicious activity.

5. The method of claim 4, further comprising:

receiving a confirmation from the user that the data access request is not from the user; and in response to receiving the confirmation, re-training the machine learning algorithm to classify the chain of events as corresponding to a behavioral model indicative of the malicious activity.

6. The method of claim 1, wherein the behavioral model is a target chain of events, and wherein determining whether the chain of events corresponds to the behavioral model comprises:

determining a deviation of the chain of events from the target chain of events that is indicative of the malicious activity; and in response to determining the deviation is less than a threshold deviation value, not verifying the data access request.

7. The method of claim 6, wherein each respective event in the target chain of events is assigned a weight indicative of an importance of the respective event.

8. The method of claim 1, wherein determining whether the chain of events corresponds to a behavioral model indicative of malicious activity is based on an order of events involving the person, another order of the events involving the user, and an amount of time in between each event.

9. A system for verifying user activity based on behavioral models, the system comprising:

a hardware processor configured to:

receive sensor data from at least one sensor in an environment;

parse the sensor data to determine a first identifier of a person that is not authorized to access data via a computing device;

subsequent to determining the first identifier, intercept a data access request on the computing device, wherein the data access request includes a second identifier of a user that is authorized to access the data via the computing device;

verify whether the data access request is from the user authorized to access data by:

generating a chain of events for a period of time preceding the data access request, wherein the chain of events includes generated events including identifiers of the person that is not authorized to access the data via the computing device and the user that is authorized;

determining whether the chain of events corresponds to a behavioral model indicative of malicious activity; and in response to determining that the chain of events do not correspond to the behavioral model, verifying that the data access request is from the user and granting the data access request.

10. The system of claim 9, wherein the hardware processor is further configured to:

in response to determining that the chain of events corresponds to the behavioral model, not verify that the data access request is from the user and block the data access request.

11. The system of claim 9, wherein the hardware processor is configured to generate the chain of events including the person and the user in response to determining the first identifier and intercepting the data access request with the second identifier within a threshold period of time.

12. The system of claim 9, wherein the hardware processor is further configured to determine whether the chain of events corresponds to a behavioral model indicative of malicious activity by:

inputting the chain of events into a machine learning algorithm that classifies whether an input chain of events comprises the malicious activity, wherein the machine learning algorithm is trained with a dataset that comprises a plurality of behavioral models each including events associated with the malicious activity; and receiving an output from the machine learning algorithm indicating whether the chain of events corresponds to a behavioral model indicative of the malicious activity.

13. The system of claim 12, wherein the hardware processor is further configured to:

receive a confirmation from the user that the data access request is not from the user; and in response to receiving the confirmation, re-train the machine learning algorithm to classify the chain of events as corresponding to a behavioral model indicative of the malicious activity.

14. The system of claim 9, wherein the behavioral model is a target chain of events, and wherein the hardware processor is further configured to determine whether the chain of events corresponds to the behavioral model by:
   determining a deviation of the chain of events from the target chain of events that is indicative of the malicious activity; and
   in response to determining the deviation is less than a threshold deviation value, not verifying the data access request.

15. The system of claim 9, wherein the hardware processor is further configured to determine whether the chain of events corresponds to a behavioral model indicative of malicious activity based on an order of events involving the person, another order of the events involving the user, and an amount of time in between each event.

16. The system of claim 15, wherein each respective event in the target chain of events is assigned a weight indicative of an importance of the respective event.

17. A non-transitory computer readable medium storing thereon computer executable instructions for verifying user activity based on a behavioral models, including instructions for:
   receiving sensor data from at least one sensor in an environment;
   parsing the sensor data to determine a first identifier of a person that is not authorized to access data via a computing device;
   subsequent to determining the first identifier, intercepting a data access request on the computing device, wherein the data access request includes a second identifier of a user that is authorized to access the data via the computing device;
   verifying whether the data access request is from the user authorized to access data by:
      generating a chain of events for a period of time preceding the data access request, wherein the chain of events includes generated events including identifiers of the person that is not authorized to access the data via the computing device and the user that is authorized;
      determining whether the chain of events corresponds to a behavioral model indicative of malicious activity; and
      in response to determining that the chain of events do not correspond to the behavioral model, verifying that the data access request is from the user and granting the data access request.

* * * * *